US012724959B1

(12) United States Patent
Bergquist

(10) Patent No.: US 12,724,959 B1
(45) Date of Patent: Sep. 1, 2026

(54) AUTOMATED PRE-APPROVAL GENERATION BASED ON REAL ESTATE SEARCH

(71) Applicant: HouseManta, INC., Seattle, WA (US)

(72) Inventor: Kyle Bergquist, Seattle, WA (US)

(73) Assignee: HOUSEMANTA, INC., Seattle, WA (US)

( * ) Notice: Subject to any disclaimer, the term of this patent is extended or adjusted under 35 U.S.C. 154(b) by 0 days.

(21) Appl. No.: 19/196,229

(22) Filed: May 1, 2025

(51) Int. Cl.
*G06F 40/166* (2020.01)
*G06F 16/9535* (2019.01)
*G06Q 30/0283* (2023.01)
*G06Q 40/03* (2023.01)
*G06Q 50/16* (2012.01)

(52) U.S. Cl.
CPC ........ *G06F 40/166* (2020.01); *G06F 16/9535* (2019.01); *G06Q 30/0283* (2013.01); *G06Q 40/03* (2023.01); *G06Q 50/16* (2013.01)

(58) Field of Classification Search
None
See application file for complete search history.

(56) References Cited

U.S. PATENT DOCUMENTS 7,333,943 B1 2/2008 Charuk et al.
8,433,650 B1 * 4/2013 Thomas ................. G06Q 40/02 705/38
9,846,917 B1 * 12/2017 Watkins, III ........... G06Q 40/00
10,810,692 B1 * 10/2020 Thomas ................. G06Q 10/06
11,328,354 B1 * 5/2022 Maeng ................... G06Q 40/03
11,379,897 B1 * 7/2022 Thomas ................. G06Q 50/16
11,393,059 B1 * 7/2022 Thomas ................. G06Q 40/03
11,615,432 B1 * 3/2023 Morrison ......... G06Q 10/06313 705/7.23
2003/0149659 A1 * 8/2003 Danaher ................ G06Q 40/04 705/38
2004/0073508 A1 * 4/2004 Foster ................ G06Q 30/0206 705/38
2004/0220906 A1 11/2004 Gargi et al.
2005/0273346 A1 * 12/2005 Frost .................... G06Q 50/167 705/26.1
2010/0036750 A1 * 2/2010 Whelan .................. G06Q 50/16 705/26.1

(Continued)

OTHER PUBLICATIONS

Non-Final Office Action, U.S. Appl. No. 19/196,253, Notification Date: Jul. 3, 2025, 36 pages.

(Continued)

*Primary Examiner* — Maikhanh Nguyen
(74) *Attorney, Agent, or Firm* — FREESTONE INTELLECTUAL PROPERTY LAW PLLC; Aaron J. Visbeek

(57) ABSTRACT

Generating a mortgage pre-approval document includes rendering display results from searching a real estate database. The display results include one or more real estate listings overlayed on a map. A user input is received selecting a selected real estate listing from the one or more real estate listings in the display results. The selected real estate listing includes a listing price. A calculated monthly payment is calculated based at least in part on the listing price. A maximum monthly payment of a user is received. The mortgage pre-approval document is generated when the calculated monthly payment is less than maximum monthly payment.

20 Claims, 14 Drawing Sheets

(56) References Cited

U.S. PATENT DOCUMENTS

| | | | | |
|---|---|---|---|---|
| 2010/0145828 | A1 | 6/2010 | Callow et al. | |
| 2013/0297378 | A1 | 11/2013 | Hong | |
| 2013/0332372 | A1 | 12/2013 | Marshall | |
| 2014/0218400 | A1 | 8/2014 | O'Toole et al. | |
| 2015/0095211 | A1* | 4/2015 | Bell | G06Q 40/03 705/38 |
| 2015/0269264 | A1 | 9/2015 | Bolen | |
| 2016/0048906 | A1 | 2/2016 | Eraker et al. | |
| 2016/0343070 | A1* | 11/2016 | Baglioni | G06Q 40/00 |
| 2020/0273098 | A1* | 8/2020 | Marr | G06Q 40/03 |
| 2020/0294095 | A1* | 9/2020 | Buerger | G06Q 30/0269 |
| 2021/0150648 | A1* | 5/2021 | Neely | G06Q 50/16 |
| 2022/0164905 | A1 | 5/2022 | Reutov | |
| 2022/0398287 | A1 | 12/2022 | Ockhardt et al. | |
| 2022/0398678 | A1* | 12/2022 | Fox | G06Q 50/167 |
| 2022/0414806 | A1 | 12/2022 | Rusek et al. | |
| 2023/0130143 | A1* | 4/2023 | Chandy | G06F 16/9535 705/27.2 |
| 2023/0162302 | A1* | 5/2023 | Fahl | G06Q 40/06 705/36 R |

OTHER PUBLICATIONS

Non-Final Office Action, U.S. Appl. No. 19/251,557, Notification Date: Aug. 26, 2025, 21 pages.

* cited by examiner

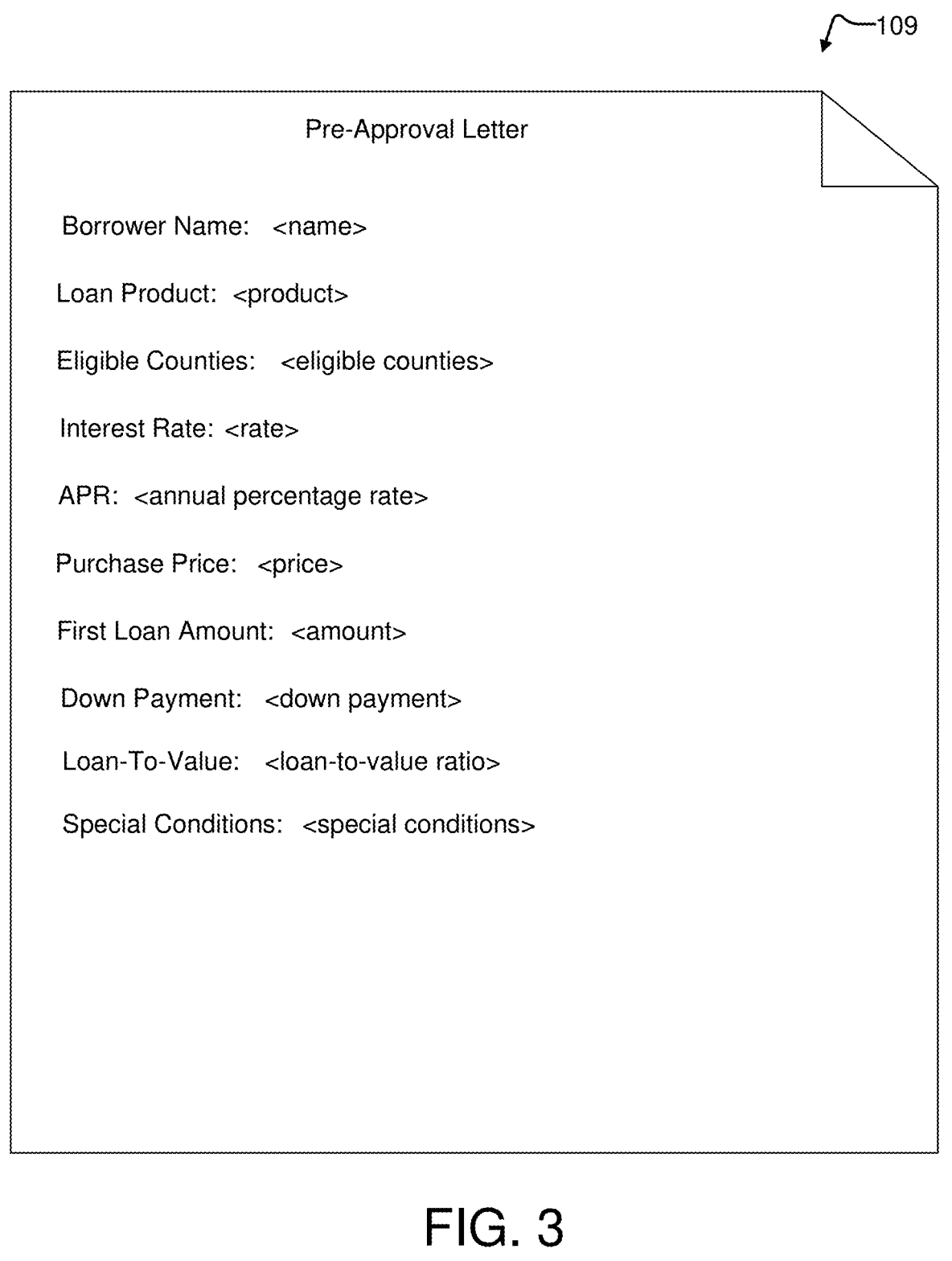

109

Pre-Approval Letter

Borrower Name: <name>

Loan Product: <product>

Eligible Counties: <eligible counties>

Interest Rate: <rate>

APR: <annual percentage rate>

Purchase Price: <price>

First Loan Amount: <amount>

Down Payment: <down payment>

Loan-To-Value: <loan-to-value ratio>

Special Conditions: <special conditions>

FIG. 3

AUTOMATED PRE-APPROVAL GENERATION BASED ON REAL ESTATE SEARCH

TECHNICAL FIELD

This disclosure relates generally to real estate information tools, and more particularly, to providing automated pre-approval generation based on map-based real estate searches by loan product.

BACKGROUND INFORMATION

Real estate information tools are often used by potential home buyers to search properties based on listing prices or price ranges. For example, a potential buyer may input search parameters including a home price range, and receive results such as a listing of homes listed within the home price range.

Upon choosing a potential home for purchase, or upon deciding to pursue a home purchase in general, the potential home buyer may also seek pre-approval for a home loan. Generally, pre-approvals are processed by a loan officer. It follows that as loan officers may not always be available, and some home listings may become active while loan officers are not available, that some potential home buyers may miss out on purchasing a particular home due to timing constraints and/or availability of a loan officer to process a pre-approval application.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 is a schematic of an example pre-approval document, in accordance with aspects of the disclosure.

DETAILED DESCRIPTION

Figure 1:
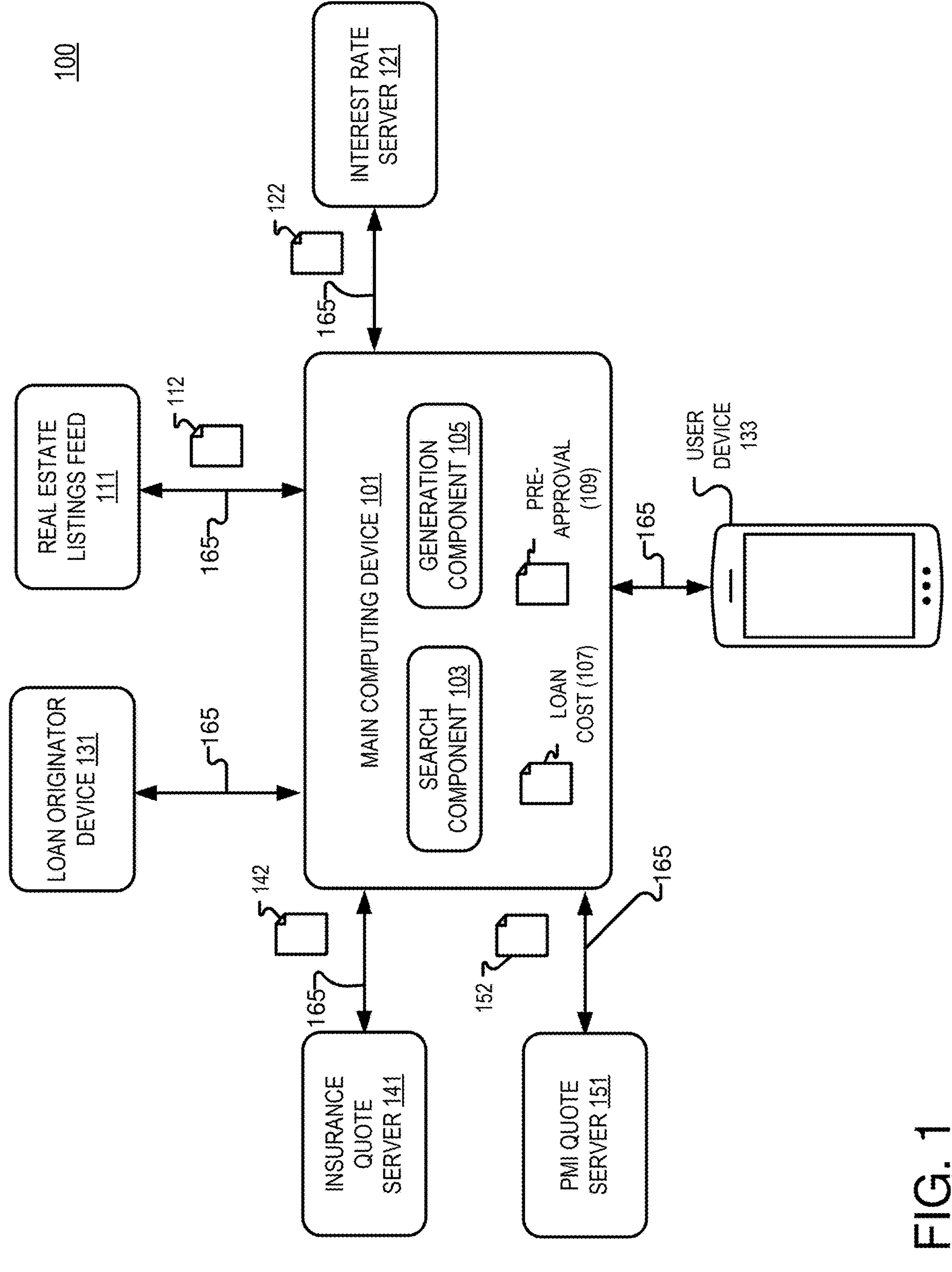
FIG. 1 illustrates a computing system for automated generation of pre-approval documents and/or loan cost documents, in accordance with aspects of the disclosure.

Embodiments of automated pre-approval generation and map-based real estate searches by loan product are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Real estate information tools (e.g., real estate search tools) are often used by potential home buyers to search properties based on listing prices or price ranges. Upon choosing a potential home for purchase, or upon deciding to pursue a home purchase in general, the potential home buyer may also seek pre-approval for a home loan. Generally, pre-approvals are processed by a loan officer. It follows that as loan officers may not always be available, and as some home listings may become active while loan officers are not available, that some potential home buyers may miss out on purchasing a particular home due to timing constraints and/or availability of a loan officer to process a pre-approval application.

Furthermore, conventional real estate search tools often rely on particular search syntax (e.g., multiple listing service (MLS) syntax or numerical codes), are restricted to particular search parameters (e.g., price, square footage, or acreage), or are otherwise cumbersome for use by potential home buyers. For example, in conventional real estate search tools, many search parameters are pre-populated or are restricted to particular parameters. In these examples, a potential home buyer may not receive search results that are suitable for a particular financing type or form of loan. Moreover, some real estate listings may include special financing offers, credits, or programs that are not searchable by conventional tools. Even further, some real estate listings may include properties that cannot be financed (e.g., distressed or condemned properties) but are still included in conventional search results.

Accordingly, conventional real estate search tools present drawbacks that reduce user engagement, provide inaccurate search results, provide incomplete search results, frustrate potential home buyers, and complicate processes for quickly presenting offers to home sellers.

In implementations of this disclosure, automated generation of a mortgage pre-approval documents from map-based real estate searches are provided. In implementations, a search interface (e.g., in a graphical user interface (GUI) or another interface) may be provided such that a user (e.g., a potential home buyer) may provide real estate buyer profile data representative of the user's financial data. The real estate buyer profile data may be used by a loan officer to generate an overall pre-approval for a maximum loan amount and a maximum monthly payment. In some implementations, the maximum monthly payment differs depending a geographical region (e.g. county) where the real estate is and real estate buyer profile may include different maximum monthly payments for different geographical regions.

The search interface may allow the user to select one or more loan products to conduct a search of potential homes on. The search may be effectuated by a computing device that maintains regularly updated interest rates, real estate listings, insurance data, private mortgage insurance data, and other real estate-related data. The search interface, upon a search being conducted, may provide a graphical display of a map overlayed with real estate listings matching the user's search specific criteria (e.g., loan type, pricing, etc.).

Upon selection of a home listing by the user, the computing device may automatically calculate an estimated monthly payment for the selected listing. The estimated monthly payment may be compared to the real estate buyer profile to determine if the selected listing is within the financial bounds of the user's pre-approval provided by the loan officer. If the selected listing is within the financial bounds, a pre-approval document may be automatically generated, without further input by the loan officer (e.g., even while the loan officer is unavailable), that the user may attach to a formal offer for purchase. In other implementations, the pre-approval letter is auto-generated for the loan officer and the loan officer can authorize or sign the pre-approval letter in an efficient manner such as e-signature or otherwise.

Users may search (using the exemplary search interface) based upon different types of loan products, different loan amounts, different monthly payments, and/or different purchase incentives or other data. In this manner, users of the search interface may receive pre-approval documents independently of loan officer availability or with very little fast and easy authorization from the loan officer, and user engagement may be improved.

Technical effects and technical benefits of various implementations include reduced bandwidth usage compared to inaccurate conventional search tools, reduced complexity of loan approval processes, improved chances of successful home purchases or offers during weekends and holidays (or when loan officers are otherwise unavailable or have limited availability), more relevant search results, and other benefits. Furthermore, as users may provide real estate buyer profile data and receive a general pre-approval for a maximum amount and maximum monthly payment prior to searching for a home, an overall speed of a typical home buying process may be reduced, providing for cost benefits and time benefits for the user.

Additionally, as the exemplary search interface allows for a plurality of search parameters and maintains regularly updated financing data, more relevant and accurate search results may be provided thereby reducing computational resources exhausted in search functions, improved memory usage by computing devices effectuating search functions, as well as improved power consumption for devices effectuating search functions. Therefore, implementations disclosed herein solve a unique computer-centric problem of providing more relevant search results and associated pre-approval loan documents for one or more listings in the search results, unhindered by human availability (i.e., without a loan officer being actively available), and with specific technical effects and benefits.

These and other aspects are described in more detail in connection with FIGS. 1-9.

FIG. 1 illustrates a computing system 100 for automated generation of pre-approval documents and/or loan cost documents, in accordance with aspects of the disclosure. As shown, the system 100 may include a main computing device 101 in operative communication with a real estate listings feed 111, a loan originator device 131, an insurance quote server 141, a private mortgage insurance (PMI) quote server 151, an interest rate server 121, and a user device 133, over a communications interface 165 (e.g., denoted by black arrows).

The communication interface 165 may include wireless and/or wired communication components that enable the computing device 101 to transmit data to and receive data from other networked devices (e.g., over a network, the Internet, or otherwise).

The computing device 101 may include any suitable computing device, and may include a search component 103 and a generation component 105 configured to execute on the computing device 101. In some implementations, the computing device 101 may include a server, a virtualized server, or a cloud computing device.

The search component 103 may be a software component configured to execute instructions to effectuate any of the search methods or processes disclosed herein. The search component 103 may be further configured to transmit and receive data to/from the real estate listings feed 111, the interest rate server 121, the insurance quote server 141, and/or the PMI quote server 151.

The generation component 105 may be a software component configured to execute instructions to effectuate any of the generation methods or processes disclosed herein. For example, the generation component 105 may be configured to automatically generate a loan cost worksheet 107 and a pre-approval document 109 based on user inputs received from the user device 133 and data received by the search component 103.

Real estate listings feed 111 may include access to a multiple listing service (MLS) or other real estate databases that include real estate listings. The real estate listings feed 111 may include one or more MLS feeds provided by any number of external MLS data sources. For example, the real estate listings feed 111 may provide real estate listings 112 to the computing device 101 on a periodic or regular basis. The search component 103 may be configured to scrape data from the real estate listings 112 and to categorize the real estate listings 112 based on the scraped data. Scraping data can include text-based scraping or optical character recognition and other techniques to extract language from non-text.

In some implementations, the search component 103 is configured to run one or more keyword searches on the real estate listings 112 to determine appropriate categorization based on loan products, pricing, features, financing, and other data contained in individual listings.

The interest rate server 121 may include one or more databases providing for updated interest rate data 122 on a periodic or regular basis. The interest rate data 122 may include an average interest rate based upon a loan product (e.g., loan term, down payment percentages, loan amounts, and other considerations). The search component 103 and generation component 105 may use the interest rate data 122 in determining appropriate search results and/or loan pre-approval information. Furthermore, as interest rate data and other data are updated on a regular and/or periodic basis (e.g., hourly, daily, weekly, etc.), users receive more accurate search results that are based on calculations of loan amounts, monthly payments, or other financial data that is more accurate and up-to-date, thereby reducing unnecessary and/or repetitive searches.

The loan originator device 131 may be a computing device associated with a financial institution or a loan officer. The loan originator device 131 may be used to provide an initial, overall loan pre-approval based on financial data received from the user device 133.

The insurance quote server 141 may include one or more sources of insurance quote data 142 for home loans in a geographic area of interest to a user of the user device 133. In one implementation, the geographic area of interest is based upon an Internet protocol (IP) address of the user device 133. In one implementation, the geographic area of interest is provided as user input by the user device 133 or the loan originator device 131. The insurance quote data 142 may be used by the search component 103 and the generation component 105 in calculating home purchase costs and monthly costs associated with a potential home purchase.

The PMI quote server 151 may include one or more sources of PMI quote data 152 for home loans based on (1) proposed down payment amounts provided by the user device 133 or loan originator device 131; and/or (2) the listing prices of homes in the real estate listings 112. The PMI quote data 152 may be used by the search component 103 and generator component 105 in calculating home purchase costs and monthly costs associated with a potential home purchase.

During operation, the computing device 101 may receive user data (e.g., such as real estate buyer profile data) including: overall income, available monetary reserves, employment history, income history, and other financial data. The loan originator device 131 may process the financial data to create or update the real estate buyer profile associated with the user of the user device 133. The real estate buyer profile may further be used to establish a maximum applicable loan amount and a maximum applicable monthly payment that the particular user is pre-approved for. It is noted that the maximum applicable loan amount and maximum applicable monthly payment are not necessarily the same as any amounts used in automatically generated pre-approval documents. In this manner, an overall purchasing power of a particular user is obfuscated to aid in negotiating a reasonable home purchase price for the user. These aspects and others may provide for an improved user experience in property purchases, and may improve user engagement with a map-based real estate search interface or platform.

The user of user device 133 may input one or more search criteria into the search interface provided by the search component 103. The search component 103 may perform a search of the received real estate listings 112 to determine relevant property listings that meet the search criteria. Upon selection of a listing by the user of user device 133, and request of a loan cost worksheet and/or pre-approval document, the generation component 105 may automatically (and independently of the loan originator device 131) provide the loan cost worksheet 107 and/or pre-approval document 109 to the user device 133. In another implementation, upon selection of a listing by the user of user device 133, and request of a loan cost worksheet and/or pre-approval document, the generation component 105 may automatically provide the loan cost worksheet 107 and/or pre-approval document 109 to loan originator device 131 for authorization/approval from the loan originator or loan officer. Once the loan originator or loan officer approves the loan cost worksheet 107 and/or pre-approval document 109, one or both of the documents is provided to the user device 133 so that they may be included in an offer to purchase real estate.

Figure 2:
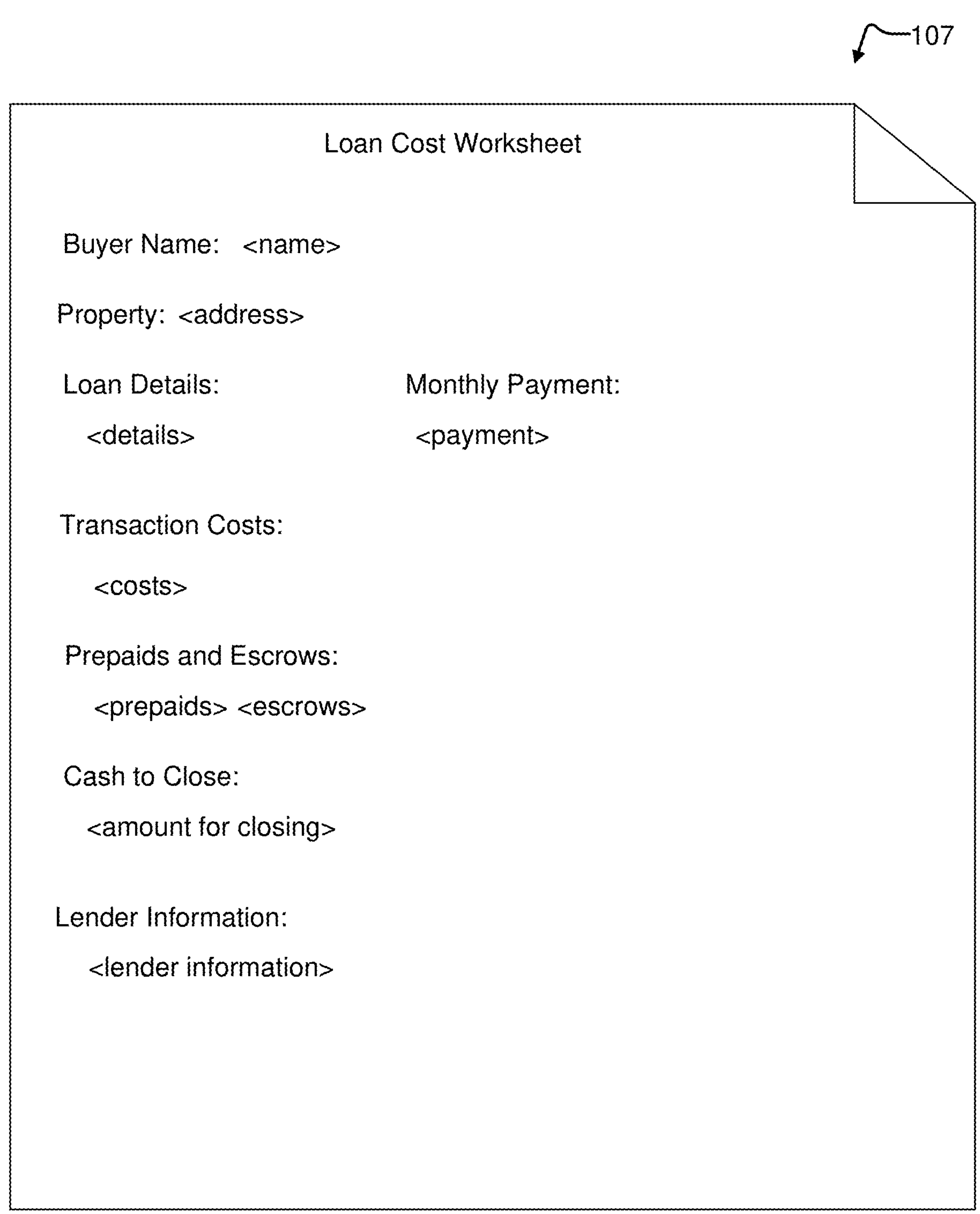
FIG. 2 is a schematic of an example loan cost document, in accordance with aspects of the disclosure.

FIG. 2 is a schematic of an example loan cost document 107, in accordance with aspects of the disclosure. As illustrated, a loan cost worksheet may include one or more of the following data: buyer name, property, loan details, monthly payment, transaction costs, prepaids and escrows, cash to close and/or lender information.

The buyer name (e.g., buyer data) may include a legal name for a potential buyer of a property. The property data may include a physical address and/or geographic information to locate the property. The buyer and property data may also optionally include an associated credit score for pricing, purchase price, percent down payment, mortgage insurance factors, funding fees, discount points, and/or debt to income ratio.

The loan details may include one or more of the following data: loan product (e.g., conventional, jumbo, federal housing administration (FHA), veteran affairs (VA), U.S. Department of Agriculture (USDA), Interest Only (IO), Adjustable Rate Mortgage (ARM) etc.), loan term (e.g., 15-years, 30-years, etc.), interest rate, annual percentage rate (APR), purchase price, loan amount, upfront mortgage insurance premium (UFMIP), occupancy (e.g., primary residence, secondary residence, rental property, etc.), loan-to-value ratio, and/or loan number.

The monthly payment may include one or more of the following data: principal and interest, homeowner's insurance, property taxes, mortgage insurance, home owner's association (HOA) dues, and other monthly costs. It is noted that monthly payment amounts may also be based upon special financing features such as, for example, seller credit, originator credit, different down payments (which can also affect interest rates), and other financing features.

The transaction costs may include one or more of the following data: origination related charges (e.g., processing, underwriting, application fees, discount points, etc.), title related charges (e.g., escrow settlement, lender's title insurance, owner's title insurance, recording fees, transfer taxes, etc.), and/or third party related fees (e.g., UFMIP, appraisal fee, credit report fee, tax service fee, flood certification fee, HOA questionnaire fee, HOA move-in fee, notary fee, etc.).

The prepaids and escrows may include one or more of the following data: daily interest charges, homeowners insurance policy charges, homeowners insurance escrow reserve, property taxes, property tax escrow reserve, etc.).

The cash to close may include one or more of the following data: down payment, other debts to be paid off, transaction costs, earnest money deposited, lender credit, seller credit, financed UFMIP or funding fee, and/or subordinate financing.

It is noted that more or fewer data may be included in the automatically generated loan cost worksheets in any implementation. Furthermore, in some cases, a user may also request a pre-approval document for a particular property.

FIG. 3 is a schematic of an example pre-approval document 109, in accordance with aspects of the disclosure. As illustrated, a pre-approval document may include some or all of the following data: borrower name, loan product description, eligible counties for the loan, interest rate for the loan, APR for the loan, purchase price for the loan, first loan amount, down payment (amount or percentage), loan-to-value ratio, and/or any special conditions upon the pre-approval. It is noted that more or fewer data may be included in the automatically generated pre-approval documents in any implementation.

As described above, the system 100 may automatically generate loan cost worksheets and pre-approval documents based on map-based searches of available properties by a user. Hereinafter, search interfaces for map-based searches in relation to the provided loan cost worksheets and/or pre-approval documents are described in detail with reference to FIGS. 4A-5C.

Figure 4A:
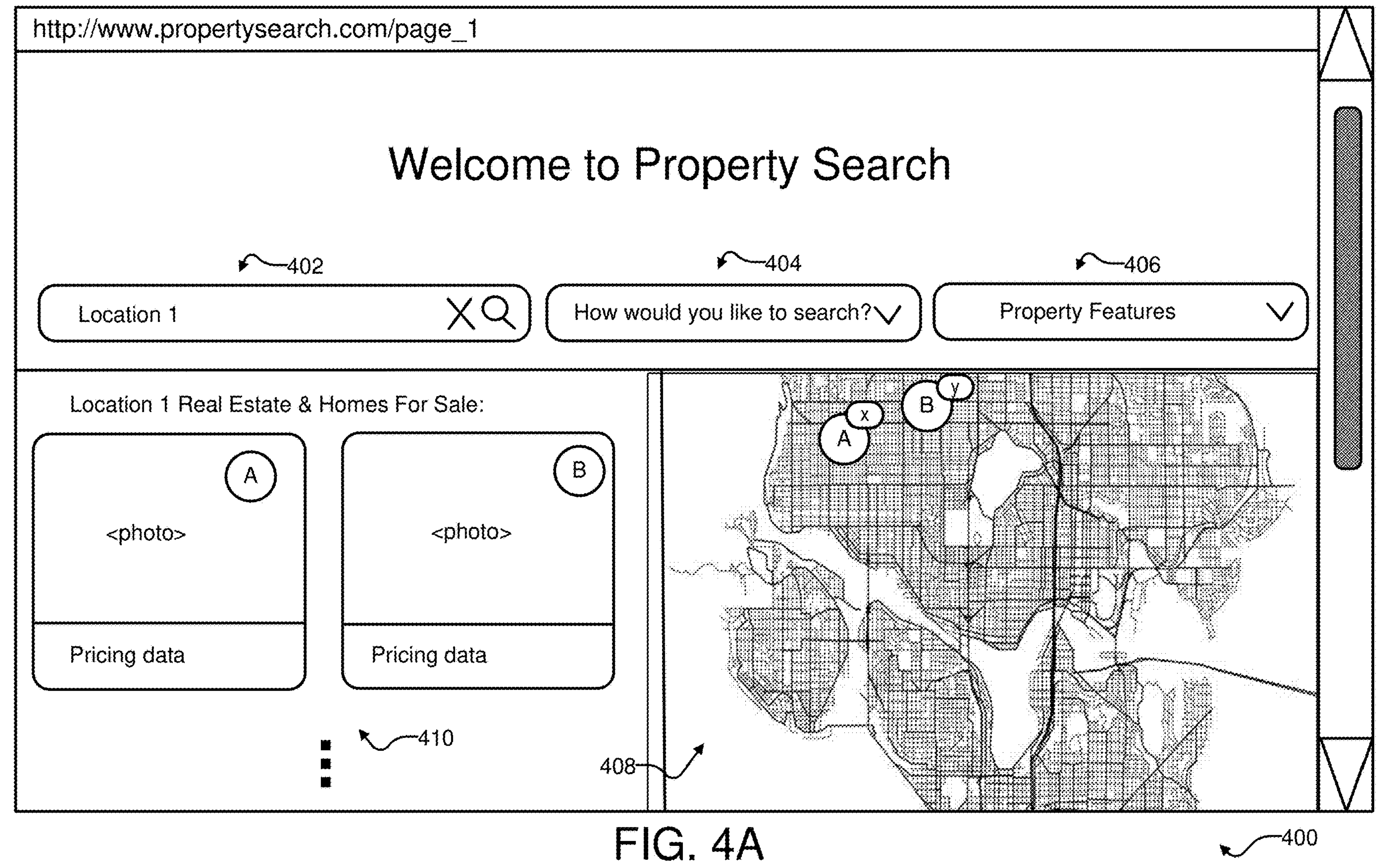
FIG. 4A illustrates an example user interface for map-based real estate searches, in accordance with aspects of the disclosure.

FIG. 4A illustrates an example user interface 400 for map-based real estate searches, in accordance with aspects of the disclosure. The interface 400 may include a location element 402, a search criteria element 404, and a property features element 406.

A user may conduct a search by inputting a geographical location (e.g., a city, county, region, or other geographic designation) as well as at least one search criteria. For example, a user may type geographic data directly into element 402. In some implementations, element 402 may be pre-populated with a geographic region based on a user's IP address. Thereafter, a map-based display 408 with overlaid search results 410 including real estate listings (e.g., labeled "A" and "B" for brevity) based on the criteria may be rendered for display to the user. The different real estate listings A and B may be paired with an associated price labeled "x" and "y"). For example, real estate listing A may be paired with a listing price or a monthly payment price "x" while a different real estate listing B may be paired with a listing price or a monthly payment price "y". Of course many more than just two real estate listings may be rendered in the search results 410. Input of search criteria is described more fully below. Map-based display 408 with overlaid search results 410 may be changed based on a user input that zooms in and out or moves side-to-side or up/down.

Figure 4B:
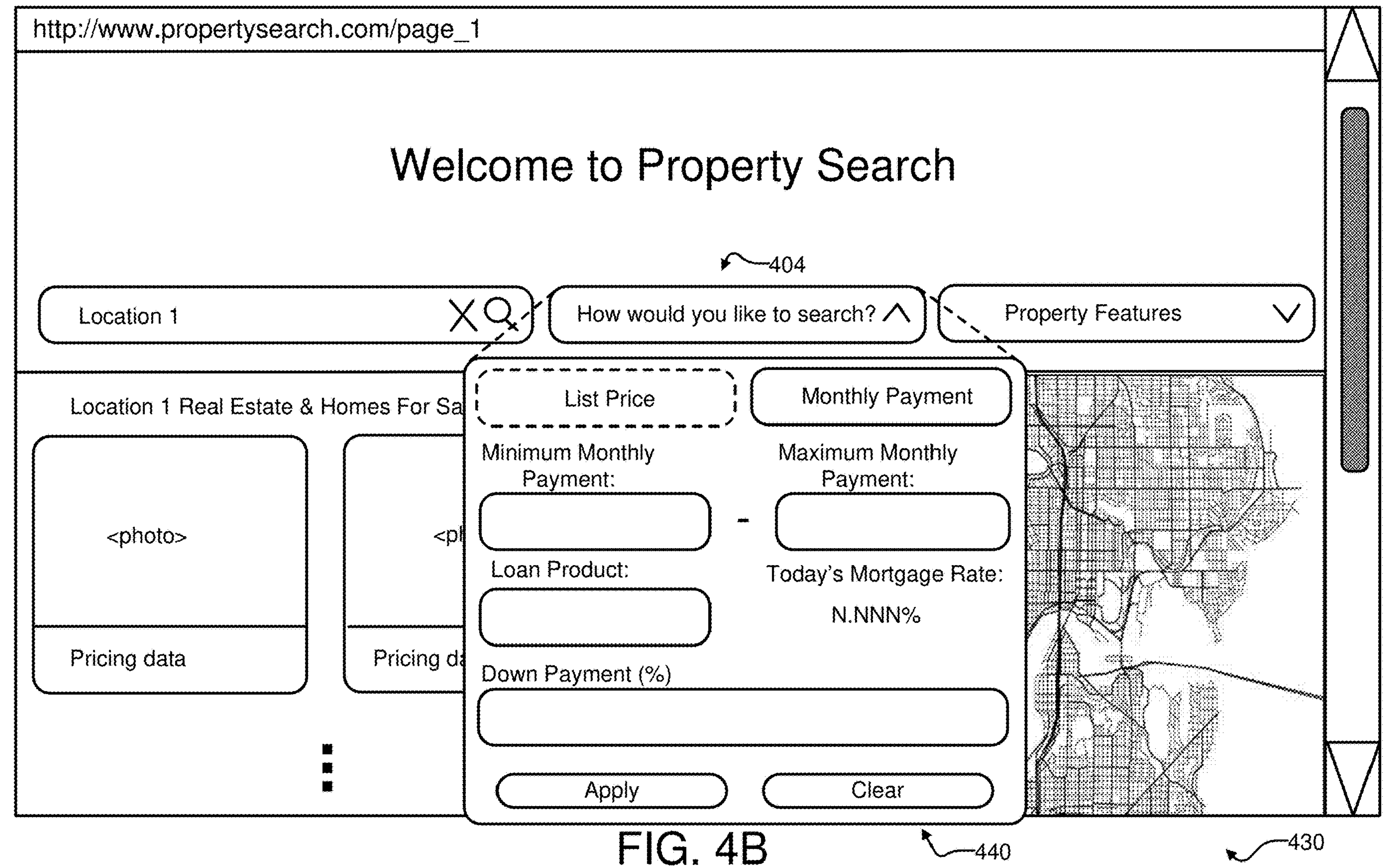
FIG. 4B illustrates an additional example user interface for map-based real estate searches, in accordance with aspects of the disclosure.

FIG. 4B illustrates an additional example user interface 430 for map-based real estate searches, in accordance with aspects of the disclosure. As illustrated, upon selection of element 404, an additional interface portion 440 may be rendered for display to the user.

The additional interface portion 440 may include selection of a monthly payment-based search. Accordingly, a user may input a minimum monthly payment, a maximum monthly payment, a desired loan product, and a down payment amount or percentage. In some implementations, a periodically or regularly updated mortgage rate may also be rendered for display to the user, to aid in determining search criteria for monthly payment-based searches. The interest rate of the mortgage may be determined by the loan product selected by the user. Input of list price-based searches are described more fully below.

Figure 4C:
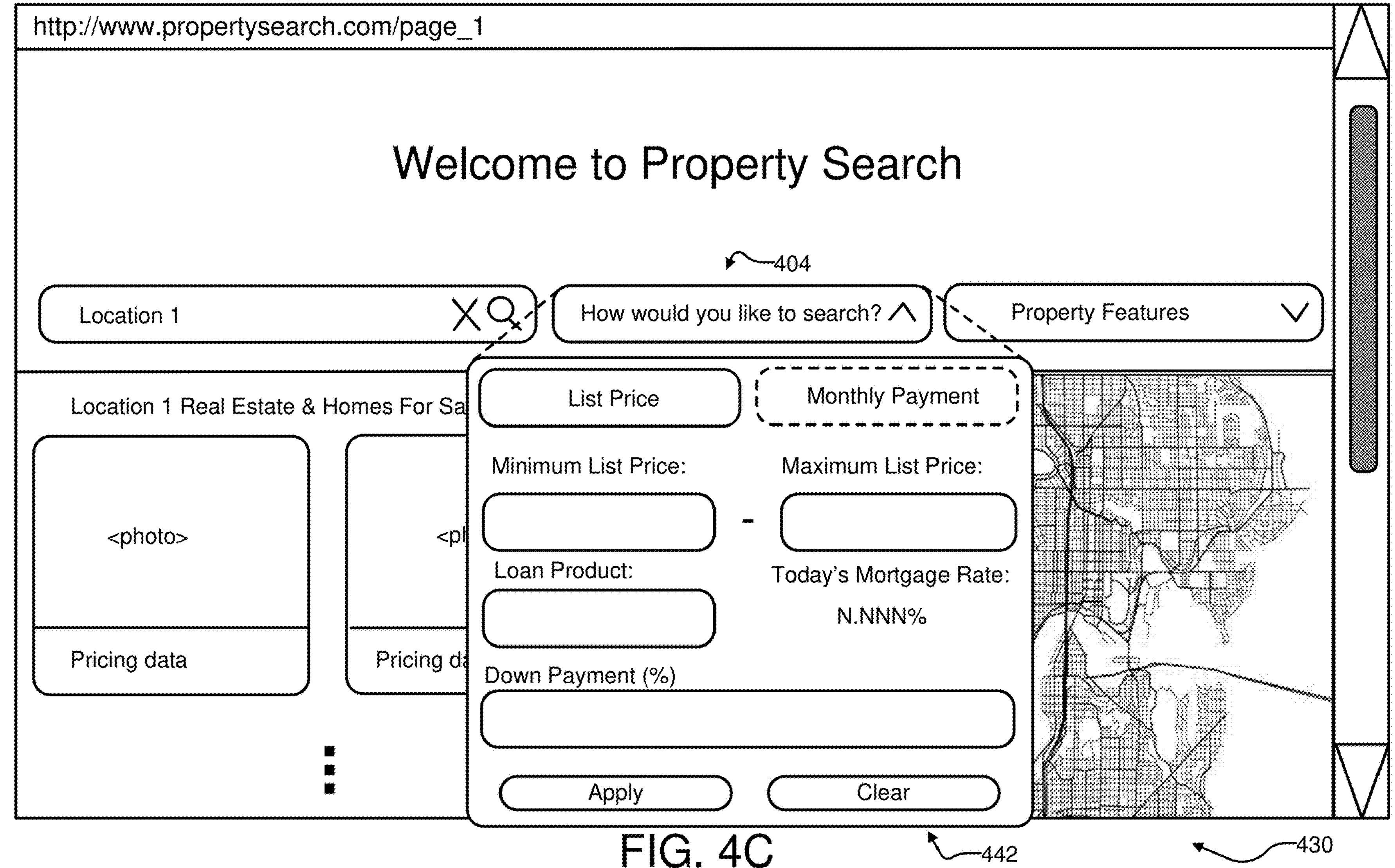
FIG. 4C illustrates an additional example user interface for map-based real estate searches, in accordance with aspects of the disclosure.

FIG. 4C illustrates an additional example user interface 430 for map-based real estate searches, in accordance with aspects of the disclosure. As illustrated, upon selection of element 404, an additional interface portion 442 may be rendered for display to the user.

The additional interface portion 442 may include selection of a list price-based search. Accordingly, a user may input a minimum list price, a maximum list price, a desired loan product, and a down payment amount or percentage. In some implementations, a periodically or regularly updated mortgage rate may also be rendered for display to the user, to aid in determining search criteria for list price-based searches.

In some implementations, additional search criteria for monthly payment and list price-based searches may include a particular loan product (e.g., conventional, jumbo, FHA, VA, USDA, IO, ARM, etc.), and/or loan term (e.g., 15-years, 30-years, etc.). Further search criteria can include tailoring for first or secondary home purchases, rental home purchases, investment property purchases, cash purchases, and other types of purchases. Still further, a user may input virtually any additional search criteria including: distressed properties, cash incentives, seller credits, and other criteria to be included in the search.

Input of other search criteria such as property features are described more fully below.

Figure 4D:
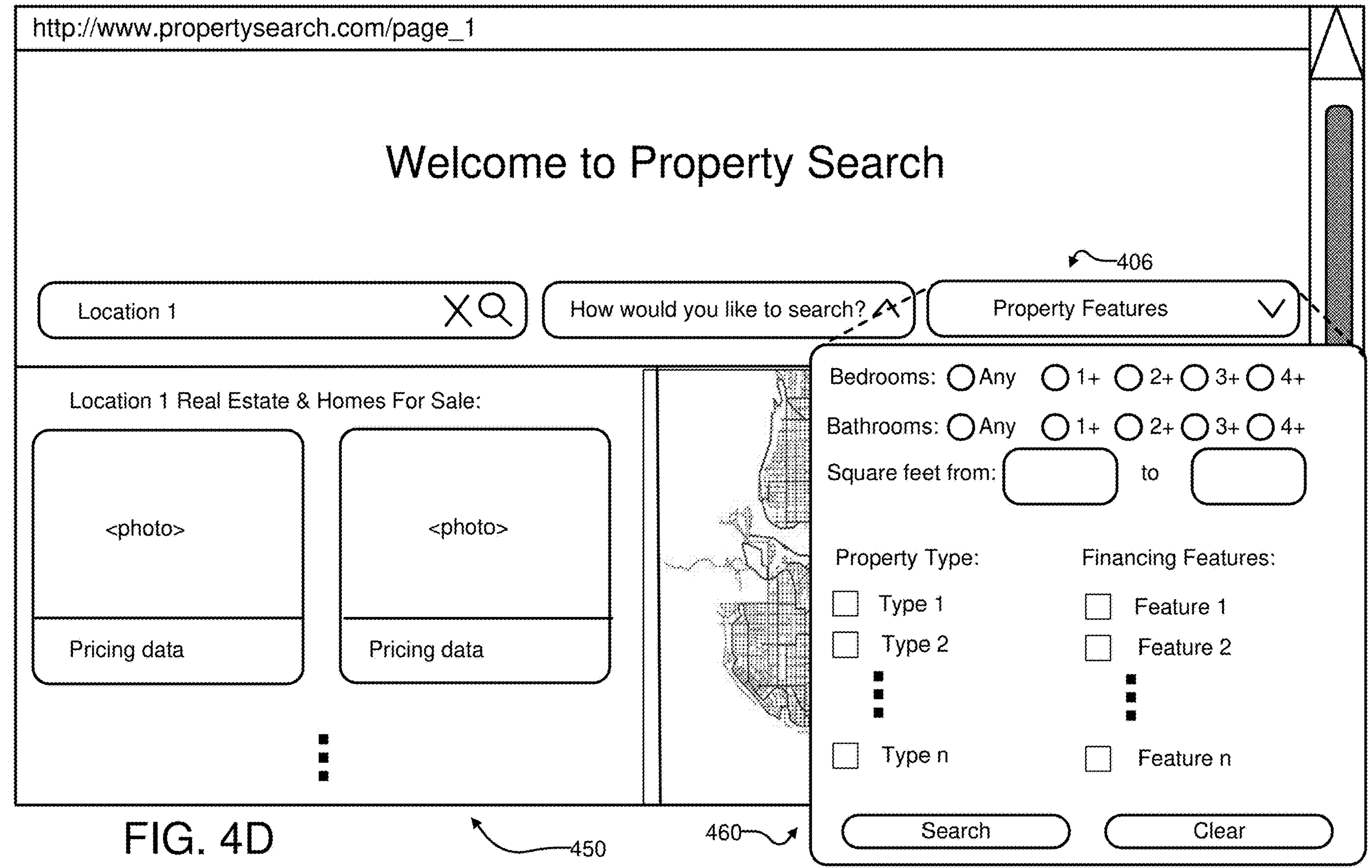
FIG. 4D illustrates yet another example user interface for map-based real estate searches, in accordance with aspects of the disclosure.

FIG. 4D illustrates yet another example user interface for map-based real estate searches, in accordance with aspects of the disclosure. As illustrated, upon selection of element 406, an additional interface portion 460 may be rendered for display to the user.

The additional interface portion 460 may include a plurality of searchable property features to aid in presenting more relevant search results. In some implementations, the plurality of searchable property features may include number of bedrooms, number of bathrooms, square footage, property types (primary, stand-alone, condominium, trailer, manufactured home, distressed, multiple-unit housing, etc.), and financing features (loan types, loan terms, cash options, seller financing, FHA loan eligibility, VA loan eligibility, seller credits, etc.).

Upon presentation of search results (e.g., as illustrated in FIG. 4A), a user may select a real estate listing from the search results. Upon selection, a user interface as illustrated in FIG. 5A may be rendered for display to the user.

Figure 5A:
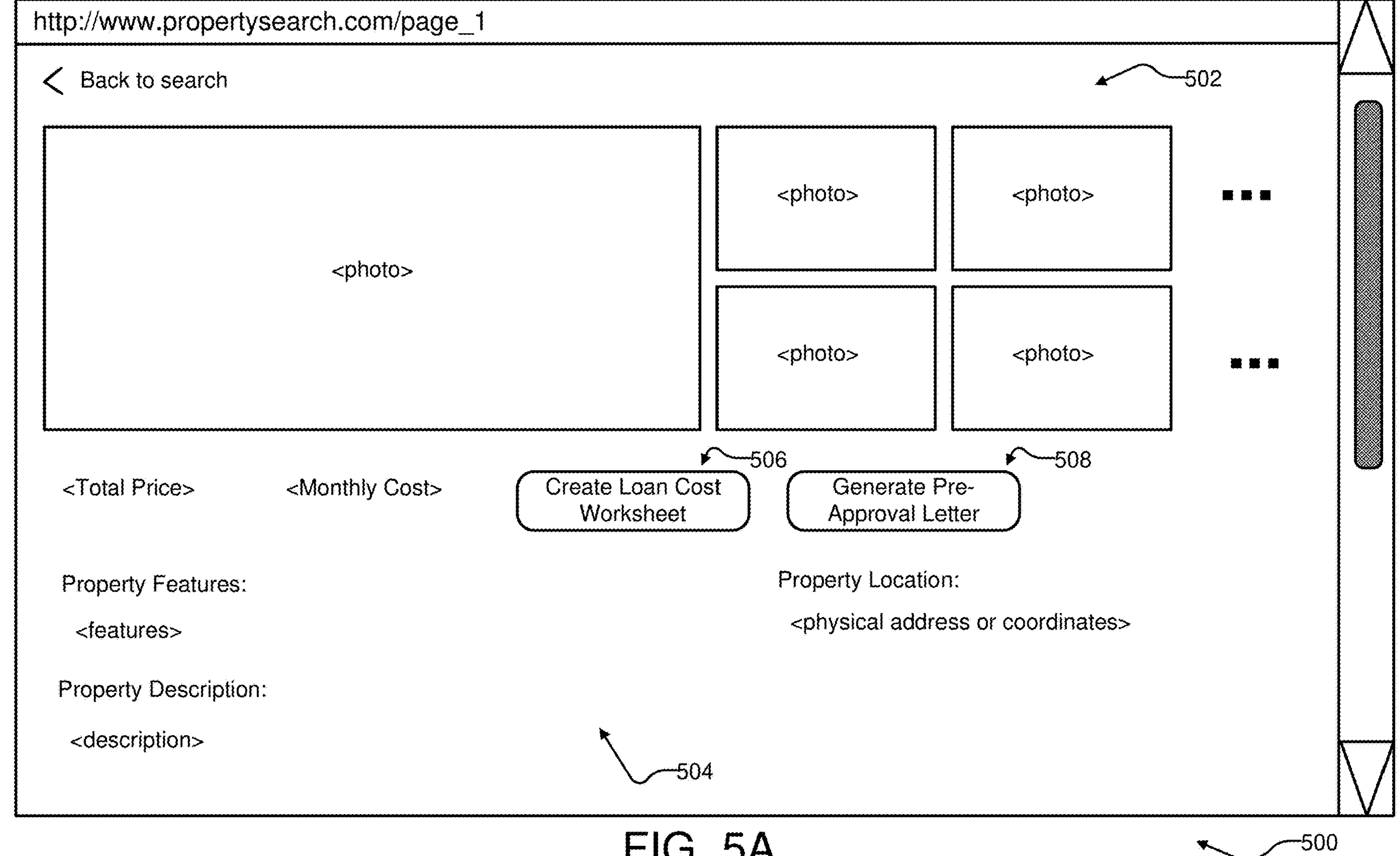
FIG. 5A illustrates an example user interface for automated generation of documents associated with a real estate offer, in accordance with aspects of the disclosure.

FIG. 5A illustrates an example user interface 500 for automated generation of documents associated with a real estate offer, in accordance with aspects of the disclosure. As illustrated, the interface 500 is rendered to display data associated with a user-selected real estate listing from the search results based on use of the interfaces 400-460. The interface 500 may include one or more property photos or illustrations 502, textual description of the property 504, a create loan cost worksheet request element 506 and a generate pre-approval letter request element 508. For example, if a user selects element 506, a loan cost worksheet may be automatically generated or a worksheet request interface may be rendered. Somewhat similarly, if a user selects element 508, a pre-approval document may be automatically generated or a pre-approval request interface may be rendered. It is noted that if a user does not concurrently have an established real estate buyer profile with overall pre-approval terms, then the element 508 may provide contact information for an available loan officer for the user to contact.

Figure 5B:
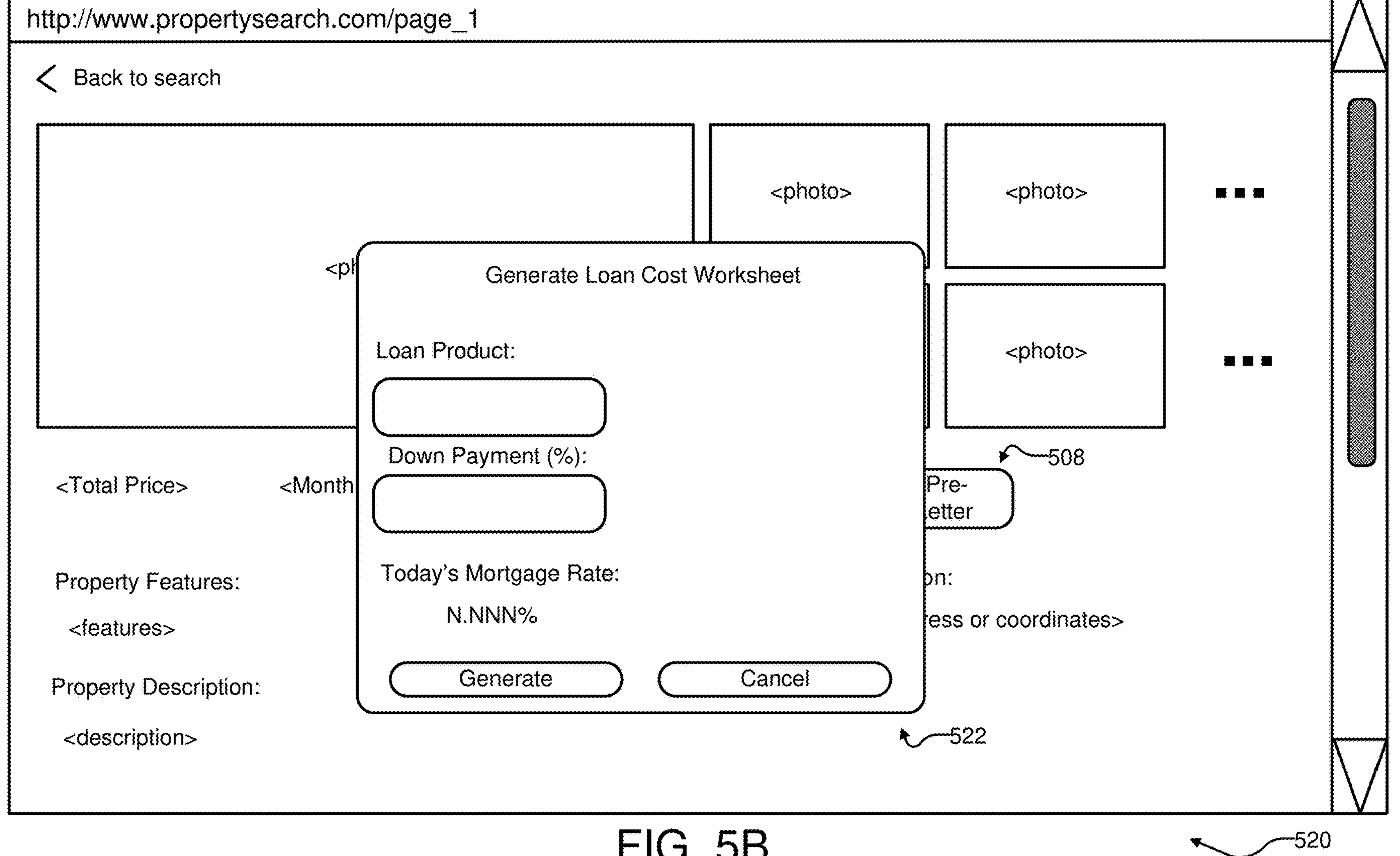
FIG. 5B illustrates an additional example user interface for automated generation of documents associated with a real estate offer, in accordance with aspects of the disclosure.

FIG. 5B illustrates an additional example user interface 520 for automated generation of documents associated with a real estate offer, in accordance with aspects of the disclosure. As illustrated, upon selection of element 506, a loan cost worksheet generation request interface 522 may be rendered for display to the user. The interface 522 may include loan product data, down payment data, and mortgage rate information. Upon input of loan product and down payment data, the user may select the "generate" element to automatically have a loan cost worksheet generated that reflects the input data. For example, a loan cost worksheet example is illustrated in FIG. 2.

Figure 5C:
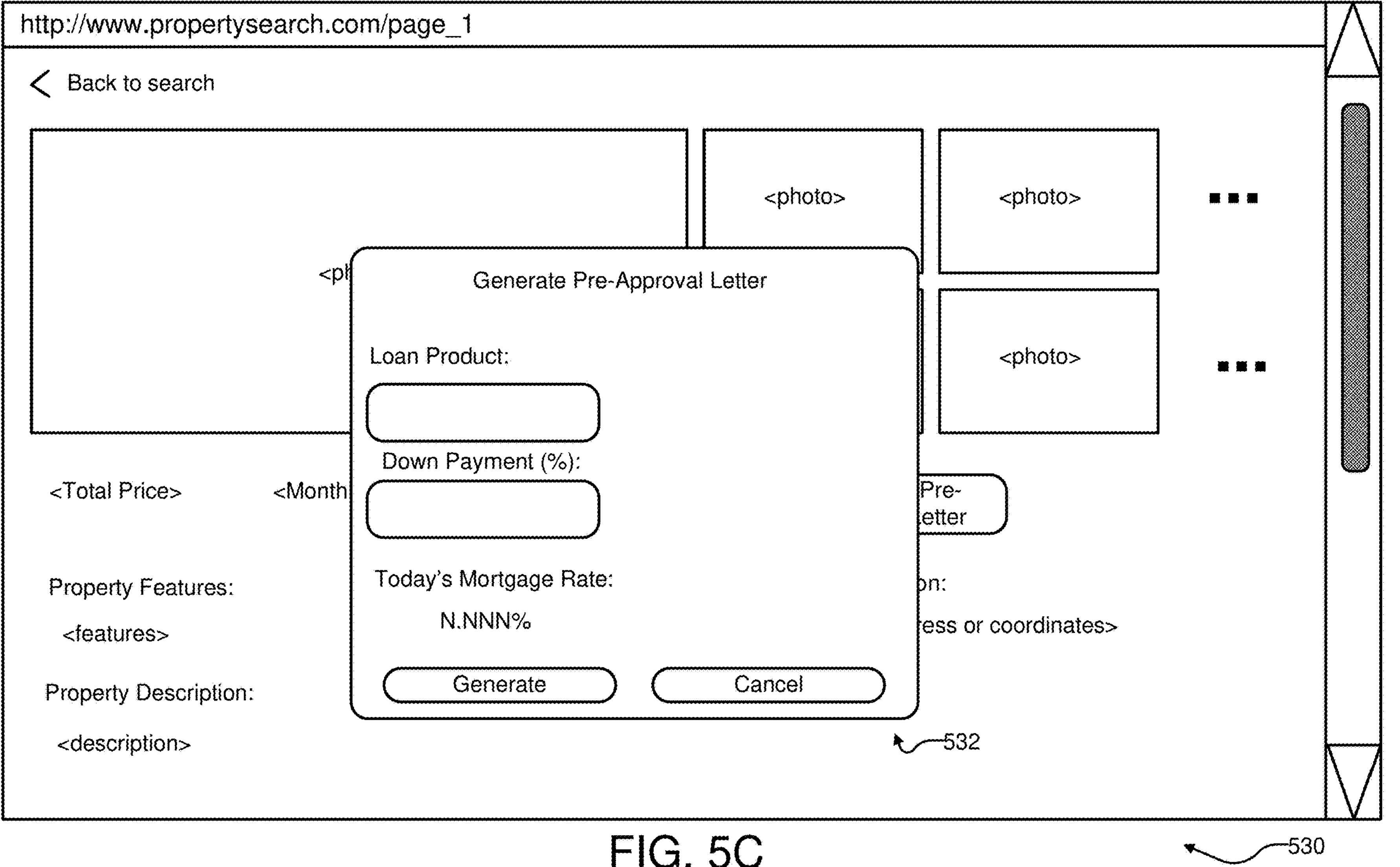
FIG. 5C illustrates yet another example user interface for automated generation of documents associated with a real estate offer, in accordance with aspects of the disclosure.

FIG. 5C illustrates yet another example user interface 530 for automated generation of documents associated with a real estate offer, in accordance with aspects of the disclosure.

As illustrated, upon selection of element 508, a pre-approval generation request interface 532 may be rendered for display to the user. The interface 532 may include loan product data, down payment data, and mortgage rate information. Upon input of loan product and down payment data, the user may select the "generate" element to automatically have a pre-approval document generated that reflects the input data. For example, a pre-approval document example is illustrated in FIG. 3.

As described above, computing systems provide novel user search interfaces for providing map-based real estate searches based on loan type. Hereinafter, operation of the computing systems is described in more detail with reference to FIGS. 6-8.

Figure 6:
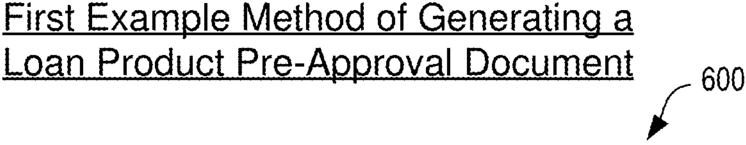
FIG. 6 is a flow chart of a first example method of generating a load product pre-approval document, in accordance with aspects of the present disclosure.
Figure 6:
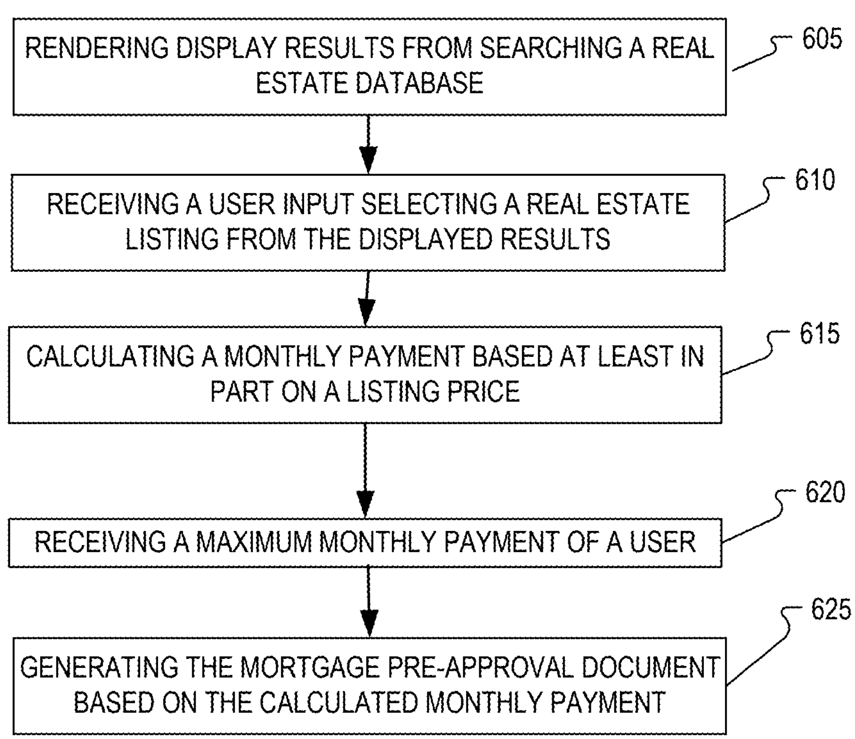

FIG. 6 is a flow chart of a first example method 600 of generating a load product pre-approval document, in accordance with aspects of the present disclosure. The order in which some or all of the process blocks appear in method 600 should not be deemed limiting. Rather, one of ordinary skill in the art having the benefit of the present disclosure will understand that some of the process blocks may be executed in a variety of orders not illustrated, or even in parallel. All or a portion of the process blocks in method 600 may be performed by search component 103 or generation component 105, for example. The method 600 begins at process block 605.

In process block 605, display results from searching a real estate database are rendered by a computing system. The display results include one or more real estate listings overlayed on a map a computing system. Block 605 is followed by block 610.

In process block 610, a user input selecting a selected real estate listing from the one or more real estate listings in the display results is received by the computing system. The selected real estate listing includes a listing price. Block 610 is followed by block 615.

In process block 615, a monthly payment is calculated based at least in part on the listing price. In some implementations, method 600 also includes periodically receiving updated interest rate data related to the one or more real estate listings and/or related to the one or more loan products selected as a search criteria. In this manner, the calculated monthly payment can further be based on the updated interest rate data. Block 615 is followed by block 620.

In process block 620, a maximum monthly payment of a user is received by the computing system. In some implementations, the maximum monthly payment of the user is an overall maximum monthly payment available to the user based on an overall loan pre-approval from a loan originator. The overall loan pre-approval may also be stored in a real estate buyer profile maintained by a loan officer or loan originator. In some implementations, the maximum monthly payment of the user is entered as a search criteria by the user via a user device communicatively coupled to the computing system. Block 620 is followed by block 625.

In process block 625, when the calculated monthly payment is less than maximum monthly payment, the pre-approval document is automatically generated by the computing system. In this manner, a loan officer need not be available for pre-approval document generation. In some implementations, the pre-approval loan document is transmitted or otherwise provided to a user device. In some implementations, the pre-approval loan document is transmitted to a telephone number or email address provided by the requesting user. Furthermore, the pre-approval loan document can also be transmitted to a loan originator device such as 131 or to another device associated with a loan originator.

In some implementations, the method 600 can also include transmitting the mortgage pre-approval document to a second computing device (e.g., 131) for review by a loan originator, receiving an approval authentication of the mortgage pre-approval document from the loan originator, and in response to receiving the approval authentication from the loan originator, providing an authenticated mortgage pre-approval document to the user.

In some implementations, the approval authentication is an e-signature of the loan originator onto the mortgage pre-approval document. A personal computing device of the loan officer may be provided with access to e-sign the mortgage pre-approval document. For example, an e-signature email with a link to an e-signature platform may be generated by computing system 100 and sent to the personal computing device of the loan officer so that the loan officer can easily e-sign the mortgage pre-approval document via a device such as a smartphone, tablet, laptop, or otherwise.

In some implementations, the method 600 also includes generating a loan cost worksheet that includes at least the calculated monthly payment and associated loan details for the selected real estate listing.

In some implementations, the loan cost worksheet further includes one or more of: transaction costs associated with an anticipated loan for the selected real estate property, prepaid and escrow costs associated with the anticipated loan, and closing costs associated with the anticipated loan.

As described above, a method may include rendering, by the computing system, display results from searching a real estate database, wherein the first display results include one or more real estate listings overlayed on a map. The method may also include receiving, by the computing system, a user input selecting a selected real estate listing from the one or more real estate listings in the display results, wherein the selected real estate listing includes a listing price. The method may also include calculating, by the computing system, a calculated monthly payment based at least in part on the listing price. Finally, the method may also include receiving, by the computing system, a maximum monthly payment of a user, and generating, by the computer system, the mortgage pre-approval document when the calculated monthly payment is less than maximum monthly payment.

While described with reference to a search based on a rendered map display, the same may be varied in many ways. For example, additional methods of generating loan product pre-approvals are described below.

Figure 7:
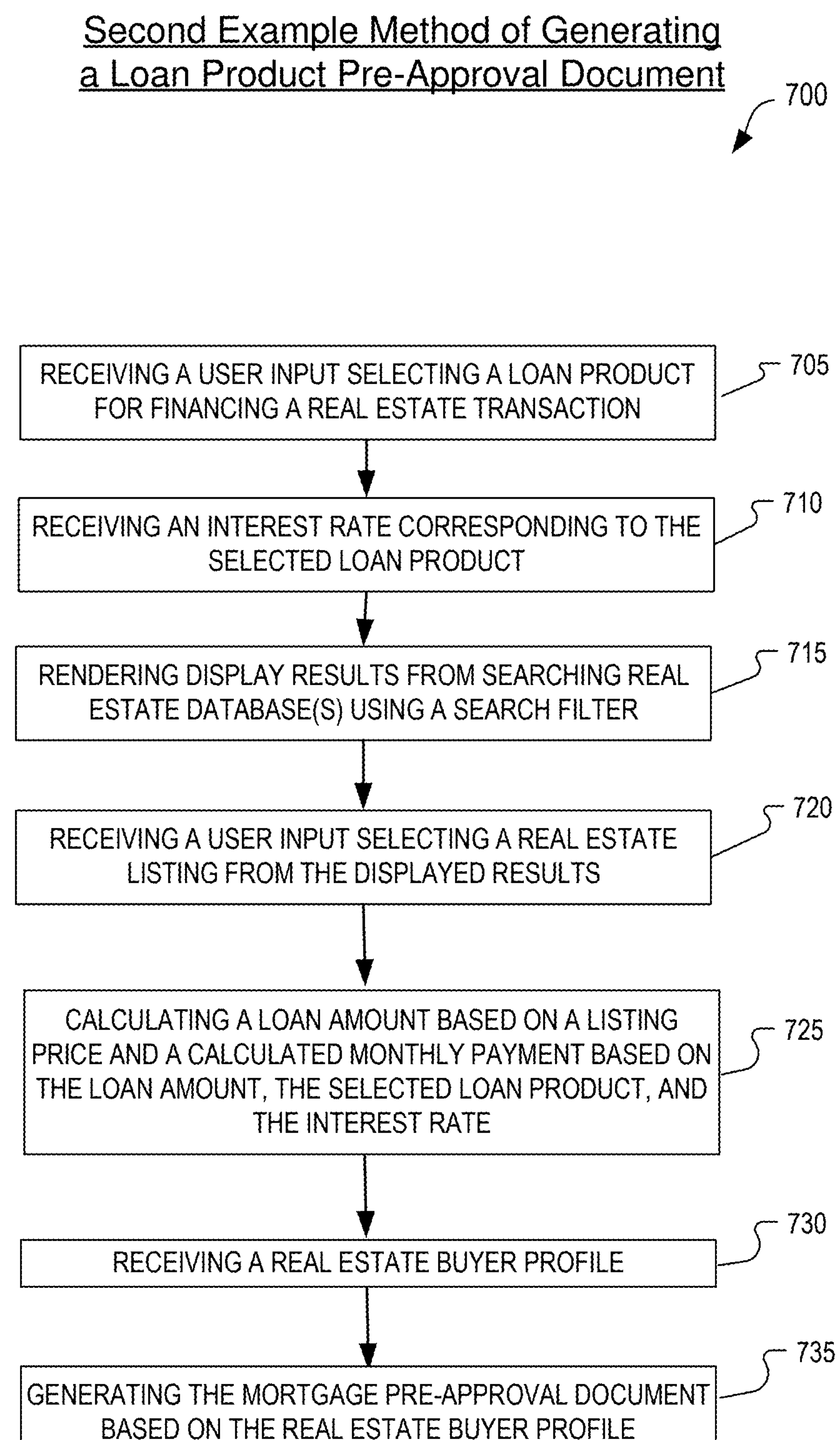
FIG. 7 is a flow chart of a second example method of generating a loan product pre-approval document, in accordance with aspects of the present disclosure.

FIG. 7 is a flow chart of a second example method 700 of generating a loan product pre-approval document, in accordance with aspects of the present disclosure. The order in which some or all of the process blocks appear in method 700 should not be deemed limiting. Rather, one of ordinary skill in the art having the benefit of the present disclosure will understand that some of the process blocks may be executed in a variety of orders not illustrated, or even in parallel. All or a portion of the process blocks in method 700 may be performed by search component 103 or generation component 105, for example. The method 700 begins at block 705.

In process block 705, a user input selecting a loan product for financing a real estate transaction is received by a computing system. The loan product includes a time repayment term (e.g., 5-year, 7-year, 15-year, 30-year, etc.). Block 705 is followed by block 710.

In process block 710, an interest rate corresponding to the selected loan product is received by the computing system. In some implementations, the interest rate is periodically or regularly updated by the computing system, for example, on a daily basis. Block 710 is followed by block 715.

In process block 715, display results from searching a real estate database are rendered using a search filter based at least in part on the interest rate corresponding to the selected loan product. The display results includes one or more real estate listings overlayed on a map. Block 715 is followed by block 720.

In process block 720, a user input selecting a selected real estate listing from the one or more real estate listings in the display results is received by the computing system. The selected real estate listing includes a listing price. Block 720 is followed by block 725.

In process block 725, the computing system calculates (1) a loan amount based on the listing price, and (2) a calculated monthly payment based on the loan amount, the selected loan product, and the interest rate corresponding to the selected loan product. In some implementations, a down-payment value is received from the user and the loan amount is also based on the down payment value received from the user.

In some implementations, the interest rate corresponding to the selected loan product is based on the downpayment value received from the user.

In some implementations, the calculated monthly payment is also calculated based on homeowners association (HOA) dues and property taxes provided by the selected real estate listing. Block 725 is followed by block 730.

In process block 730, a real estate buyer profile including (1) a maximum loan amount and (2) a maximum monthly payment is received by the computing system. The real estate buyer profile may be received from loan originator device 131 or be entered into a user interface by the user. Block 730 is followed by block 735.

In process block 730, when both the loan amount is less than the maximum loan amount and the calculated monthly payment is less than maximum monthly payment, the computing system automatically generates the mortgage pre-approval document.

In some implementations, the mortgage pre-approval document includes: the selected loan product selected by the user input, a borrower name, a purchase price for the selected real estate listing, a down payment value, and an originator name of a loan originator. In some implementations, the mortgage pre-approval document further includes: the interest rate corresponding to the loan product, a loan amount, a loan-to-value (LTV) ratio, and a geographical condition for the mortgage pre-approval document.

In some implementations, the method 700 also includes providing the mortgage pre-approval document to the user for downloading to a user device and/or transmitting the mortgage pre-approval document to an auxiliary computing device accessible by the loan originator.

In some implementations, the method 700 also includes transmitting details of the selected real estate listing to a private mortgage insurance (PMI) quote server, and receiving a PMI estimate based on the transmitted details, wherein the calculated monthly payment is also calculated based on the PMI estimate.

In some implementations, the method 700 also includes transmitting details of the selected real estate listing to an insurance quote server, and receiving an insurance estimate based on the transmitted details, wherein the calculated monthly payment is also calculated based on the insurance estimate.

In some implementations of method 700 the selected real estate listing includes a geographical description (e.g. county) of the selected real estate listing. Due to loan rules or guidelines, different geographical regions may have different associated maximum conforming loan amounts associated with different geographical regions. Hence, the real estate buyer profile may have different maximum monthly payments associated with different geographical regions. In implementations of process 700, the maximum monthly payment of the real estate buyer profile may be provided based on the county of the selected real estate listing.

As described above, a method may include receiving, by the computing system, a user input selecting a loan product for financing a real estate transaction, wherein the loan product includes a time repayment term. The method may also include receiving, by the computer system, an interest rate corresponding to the selected loan product. The method may also include rendering, by the computing system, display results from searching a real estate database using a search filter based at least in part on the interest rate corresponding to the selected loan product, wherein the display results include one or more real estate listings overlayed on a map. The method may also include receiving, by the computing system, a user input selecting a selected real estate listing from the one or more real estate listings in the display results, wherein the selected real estate listing includes a listing price. The method may also include calculating, by the computing system, (1) a loan amount based on the listing price; and (2) a calculated monthly payment based on the loan amount, the selected loan product, and the interest rate corresponding to the selected loan product. The method may also include receiving, by the computing system, a real estate buyer profile including (1) a maximum loan amount; and (2) a maximum monthly payment. The method may also include generating, by the computer system, the mortgage pre-approval document when both the loan amount is less than the maximum loan amount and the calculated monthly payment is less than maximum monthly payment.

While described with reference to a search based on particular loan products or features, the same may be varied many ways. For example, additional methods of generating loan product pre-approvals are described below.

Figure 8:
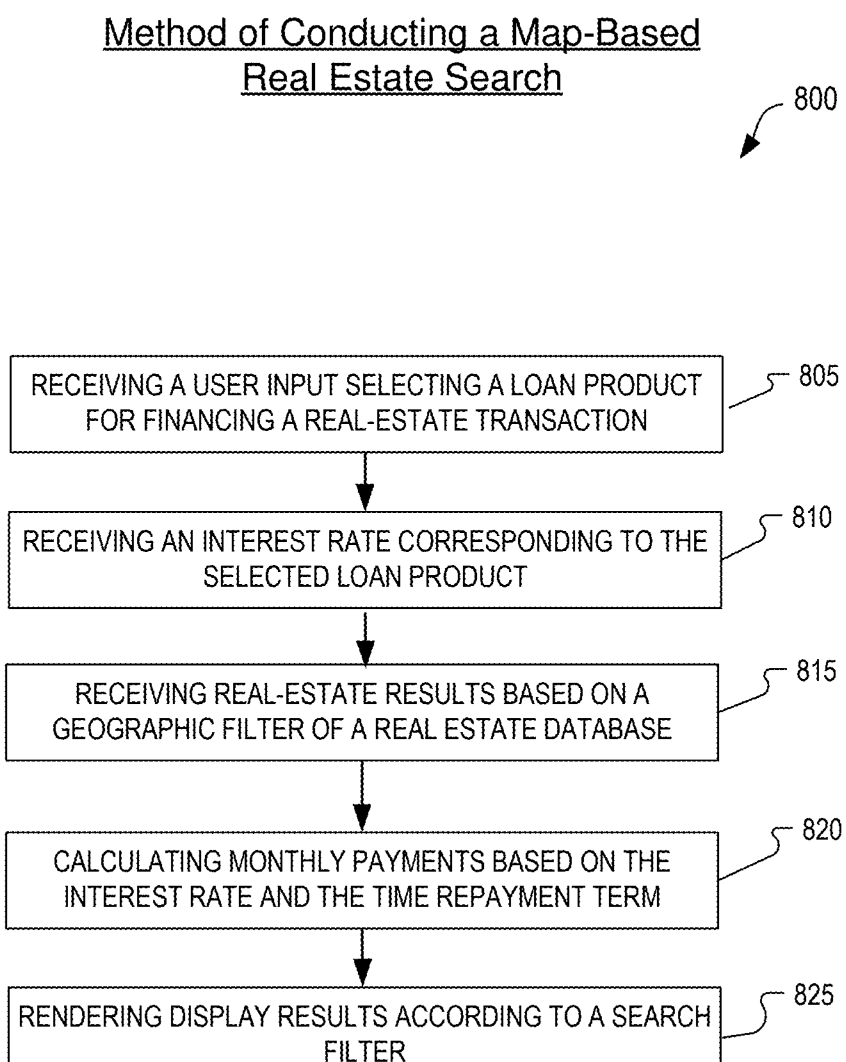
FIG. 8 is a flow chart of an example method of conducting a map-based real estate search, in accordance with aspects of the present disclosure.

FIG. 8 is a flow chart of an example method 800 of conducting a map-based real estate search, in accordance with aspects of the present disclosure. The order in which some or all of the process blocks appear in method 800 should not be deemed limiting. Rather, one of ordinary skill in the art having the benefit of the present disclosure will understand that some of the process blocks may be executed in a variety of orders not illustrated, or even in parallel. All or a portion of the process blocks in method 800 may be performed by search component 103 or generation component 105, for example. The method 800 begins at block 805.

In process block 805, a user input selecting a loan product for financing a real estate transaction is received by a computing system. The loan product includes a time repayment term (e.g., 5-year, 7-year, 15-year, 30-year, etc.). Block 805 is followed by block 810.

In process block 810, an interest rate corresponding to the selected loan product is received by the computing system. In some implementations, the selected loan product is one of: a conventional mortgage, a jumbo mortgage, a second mortgage, FHA mortgage, a VA mortgage, IO mortgage, ARM mortgage, or a U.S. Department of Agriculture mortgage. Block 810 is followed by block 815.

In process block 815, real estate results are received from searching a real estate database based on a geographic filter of a real estate database. The real estate results include one or more real estate listings that include corresponding listing prices. Block 815 is followed by block 820.

In process block 820, monthly payments from the listing prices are calculated based on (1) the interest rate associated with the selected loan product that the user selected, and (2) the time repayment term of the selected loan product. Block 820 is followed by block 825.

In process block 825, display results are rendered according to a search filter. The display results can include the one or more real estate listings paired with the monthly payment calculated for each of the real estate listings. Additionally, the real estate listing can be paired with the monthly payment overlayed on a map based on the geographic filter. In some implementations, the geographic filter is based on a geographic preference input by a user. In some implementations, the geographic filter is based on a determined location of a user device associated with the user (e.g., an IP address, GPS coordinates, etc.). For example, the search filter can also be based, at least in part, on a geographic location determined for the user and/or the user device. For example, the search filter can also be based, at least in part, on one or more property features or financing features selected by the user.

In some implementations, the method 800 also includes receiving a downpayment value from the user. The loan amount can also be based on the down payment value received from the user. Furthermore, monthly payments can be calculated based at least in part on the downpayment value from the user. Additionally, the interest rate corresponding to the selected loan product can also be based on the downpayment value received from the user.

In some implementations, the method 800 can also include receiving a monthly payment range selected by the user. For example, the search filter can include the monthly payment range. Additionally, the display results can include a filtered portion of the real estate results that have the calculated monthly payment within the monthly payment range selected by the user.

In some implementations, the method 800 can also include scraping text-based descriptions of the one or more real estate listings to identify one or more financing features associated with each of the one or more real estate listings. For example, the search filter can further be based on the identified one or more financing features. For example, the identified one or more financing features can include one or more of: seller credit, loan originator credit, cash payment option, and seller financing. Additionally, the search filter can further be based on the identified one or more financing features.

In some implementations, the method 800 can also include rendering a property features interface. For example, searching the real estate database can further be based on user input in the property features interface. For example, the property features interface can include selectable property types including one or more of: standalone home, condominium, multi-unit home, empty lot, distressed property, and manufactured home. In some implementations, the property features interface can also or alternatively include selectable financing features for properties including one or more of: seller credit, loan originator credit, cash payment option, and seller financing.

As described above, a method may include receiving, by the computing system, a user input selecting a loan product for financing a real estate transaction, wherein the selected loan product includes a time repayment term. The method may also include receiving, by the computing system, an interest rate associated with the selected loan product. The method may also include receiving, by the computing system, real estate results based on a geographic filter of a real estate database, wherein the real estate results include one or more real estate listings that include corresponding listing prices. The method can also include calculating monthly payments from the listing prices based on (1) the interest rate associated with the selected loan product that the user selected, and (2) the time repayment term of the selected loan product. Additionally, the method may include rendering, by the computing system, display results according to a search filter. The display results can include the one or more real estate listings paired with the monthly payment calculated for each of the real estate listings, and the real estate listing can be paired with the monthly payment overlayed on a map based on the geographic filter.

As described above, different methods have been presented to provide for more relevant search results for real estate listings, with automatically generated loan documents, including loan cost worksheets and pre-approval documents. Hereinafter, computing devices that may be used to implement at least a portion of the above-described aspects are described with reference to FIG. 9.

Figure 9:
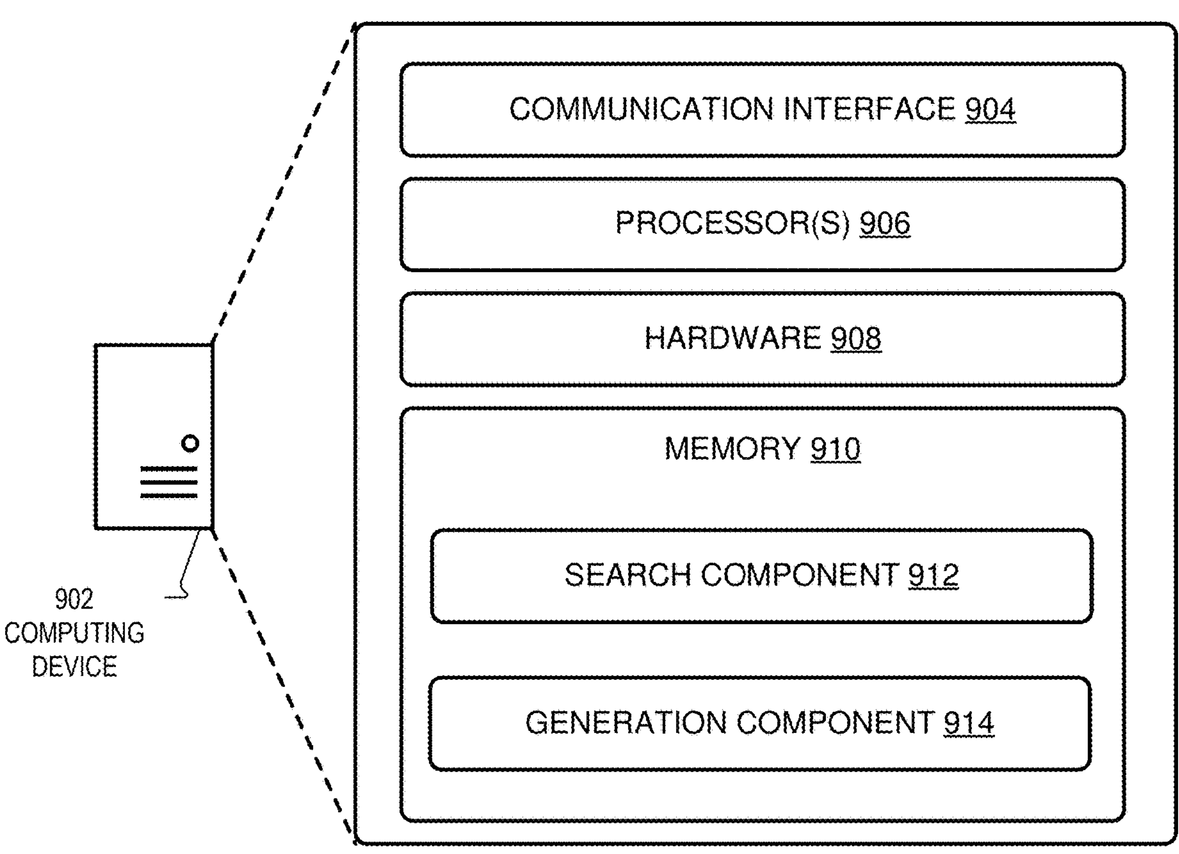
FIG. 9 illustrates an example computing device for executing processes of the disclosure, in accordance with aspects of the present disclosure.

FIG. 9 illustrates an example computing device 902, in accordance with aspects of the present disclosure. The illustrated example of computing device 902 is shown as including a communication interface 904, one or more processors 906, hardware 908, and a memory 910.

The communication interface 904 may include wireless and/or wired communication components that enable the computing device 1002 to transmit data to and receive data from other networked devices. The hardware 1008 may include additional hardware interface, data communication, or data storage hardware. For example, the hardware interfaces may include a data output device (e.g., electronic display, audio speakers), and one or more data input devices.

The memory 910 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 906 and the memory 910 of the computing device 902 may implement a search component 912 and a generation component 914. The search component 912 and generation component 914 may include routines, program instructions, objects, and/or data structures that perform particular tasks or implement particular abstract data types (e.g., perform one or more of the methods 600, 700, 800, and/or portions thereof). The memory 910 may also include a data store (not shown) that is used by the search component 912 and/or generation component 914.

The term "processing logic" in this disclosure may include one or more processors, microprocessors, multi-core processors, Application-specific integrated circuits (ASIC), and/or Field Programmable Gate Arrays (FPGAs) to execute operations disclosed herein (e.g., perform one or more of the methods 600, 700, 800, and/or portions thereof). In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method performed by a computing system for generating a mortgage pre-approval document from a map-based real estate search, the method comprising:

determining, with the computing system including a memory, a geographic location of a user device based on a Global Positioning System (GPS) coordinate of the user device that is transmitted by a wireless communication interface of the user device that is a tablet or a smartphone;

receiving, by the computing system from the user device, a user input selecting a loan product for financing a real estate transaction, wherein the loan product includes a time repayment term;

receiving, by the computing system from an interest rate server, a daily updated interest rate corresponding to the selected loan product selected by the user input;

subsequent to the loan product being selected by the user input from the user device and the daily updated interest rate being associated with the selected loan product being received from the interest rate server, rendering, by the computing system, display results from searching a real estate database using a search filter based at least in part on (1) the daily updated interest rate corresponding to the selected loan product; and (2) the geographic location determined from the GPS coordinate, wherein the display results include one or more real estate listings overlaid on a map that is rendered to a display of the user device;

receiving, by the computing system from the user device, another user input selecting a selected real estate listing from the one or more real estate listings in the display results, wherein the selected real estate listing includes a listing price;

automatically calculating, by a processor the computing system, (1) a loan amount based on the listing price; and (2) a calculated monthly payment based on the loan amount, the selected loan product, and the daily updated interest rate corresponding to the selected loan product;

receiving, by the computing system, a real estate buyer profile including (1) a maximum loan amount; and (2) a maximum monthly payment; and automatically generating, by the processor of the computing system, the mortgage pre-approval document for the selected real estate listing selected by the user input when both the loan amount is less than the maximum loan amount and the calculated monthly payment based on the daily updated interest rate is less than the maximum monthly payment.

2. The method of claim 1, wherein the mortgage pre-approval document includes:
the selected loan product selected by the user input;
a borrower name;
a purchase price for the selected real estate listing;
a down payment value; and
an originator name of a loan originator.

3. The method of claim 2 further comprising:
providing, by the computing system, the mortgage pre-approval document to a user for downloading to the user device; and
transmitting, by the computing system, the mortgage pre-approval document to an auxiliary computing device accessible by the loan originator.

4. The method of claim 2, wherein the mortgage pre-approval document further includes:
the daily updated interest rate corresponding to the loan product;
the loan amount;
a loan-to-value (LTV) ratio; and
a geographical condition for the mortgage pre-approval document.

5. The method of claim 1, further comprising:
receiving, by the computing system, a downpayment value from the user device, wherein the loan amount is also based on a down payment value received from the user.

6. The method of claim 5, wherein the daily updated interest rate corresponding to the selected loan product is based on the downpayment value received from the user.

7. The method of claim 1, wherein the selected real estate listing includes a county of the selected real estate listing, and wherein the maximum monthly payment of the real estate buyer profile is provided based on the county of the selected real estate listing.

8. The method of claim 1 further comprising:
transmitting details of the selected real estate listing to an insurance quote server, wherein the details include a location of the selected real estate listing and the listing price of the selected real estate listing; and
receiving an insurance estimate based on the transmitted details, wherein the calculated monthly payment is also calculated based on the insurance estimate.

9. The method of claim 1, wherein the mortgage pre-approval document includes the time repayment term of the loan product selected by the user input.

10. A method performed by a computing system for generating a mortgage pre-approval document from a map-based real estate search, the method comprising:
determining, with the computing system including a memory, a geographic location of a user device based on a Global Positioning System (GPS) coordinate of the user device that is transmitted by a wireless communication interface of the user device;
rendering to a display of the user device, by the computing system, display results from searching a real estate database based on a search filter based at least in part on the geographic location determined from the GPS coordinate of the user device, wherein the display results include one or more real estate listings overlaid on a map;
receiving from the user device, by the computing system, a user input selecting a selected real estate listing from the one or more real estate listings in the display results displayed based at least in part on the geographic location determined from the GPS coordinate, wherein the selected real estate listing includes a listing price;
receiving, by the computing system, a daily updated interest rate;
automatically calculating, by a processor of the computing system, a calculated monthly payment based at least in part on the daily updated interest rate;
receiving, by the computing system, a maximum monthly payment of a user; and
automatically generating, by the processor of the computer system, the mortgage pre-approval document for the selected real estate listing selected by the user input, wherein the mortgage pre-approval document includes the updated daily interest rate when the calculated monthly payment is less than the maximum monthly payment.

11. The method of claim 10, further comprising:
transmitting, by the computing system, the mortgage pre-approval document to a second computing device for review by a loan originator;
receiving an approval authentication of the mortgage pre-approval document from the loan originator; and
in response to receiving the approval authentication from the loan originator, providing an authenticated mortgage pre-approval document to the user.

12. The method of claim 11, wherein the approval authentication is an e-signature of the loan originator onto the mortgage pre-approval document.

13. The method of claim 10, wherein the maximum monthly payment of the user is an overall maximum monthly payment available to the user based on an overall loan pre-approval from a loan originator.

14. The method of claim 10, further comprising:
periodically receiving updated interest rate data related to the one or more real estate listings, wherein the calculated monthly payment is further based on the updated interest rate data.

15. The method of claim 10, further comprising:
generating, by the computer system, a loan cost worksheet comprising at least the calculated monthly payment and associated loan details for the selected real estate listing.

16. The method of claim 10 further comprising:
transmitting, by the computing system, the mortgage pre-approval document to an auxiliary computing device accessible by a Loan Originator.

17. The method of claim 10, wherein the maximum monthly payment is received by the computing system from a real estate buyer profile transmitted by an auxiliary computing device of a Loan Originator.

18. A method performed by a computing system for generating a mortgage pre-approval document from a map-based real estate search, the method comprising:
determining, with the computing system including a memory, a geographic location of a user device based on a Global Positioning System (GPS) coordinate of the user device that is transmitted by a wireless communication interface of the user device;
receiving, by the computing system from the user device, a user input selecting a loan product for financing a real estate transaction, wherein the loan product includes a time repayment term;
receiving a daily updated interest rate corresponding to the selected loan product selected by the user input;
rendering to the user device, the selected loan product and the daily updated interest rate corresponding to the selected loan product;
rendering to a display of the user device, display results from searching a real estate database using a search filter based at least in part on the daily updated interest rate corresponding to the selected loan product, wherein the search filter is also based on the geographic location determined from the GPS coordinate of the user device, the display results including one or more real estate listings overlaid on a map;

receiving, by the computing system from the user device, another user input selecting a selected real estate listing from the one or more real estate listings in the display results, wherein the selected real estate listing includes a listing price;

rendering to the display of the user device, a user interface including property photos, a description of the selected real estate listing, and a pre-approval letter request element; and responsive to a user selection of the pre-approval letter request element in the user interface rendered to the display of the user device:

automatically calculating (1) a loan amount based on the listing price; and (2) a calculated monthly payment based on the loan amount, the selected loan product, and the daily updated interest rate corresponding to the selected loan product;

receiving, by the computing system, a real estate buyer profile including (1) a maximum loan amount; and (2) a maximum monthly payment; and automatically generating, by a processor of the computing system, the mortgage pre-approval document when both the loan amount is less than the maximum loan amount and the calculated monthly payment is less than maximum monthly payment.

19. The method of claim 18, wherein the property photos, the description of the selected real estate listing, and the pre-approval letter request element are rendered at the same time on the user interface rendered to the display of the user device.

20. The method of claim 18, wherein the mortgage pre-approval document includes the loan amount calculated subsequent to the user selection of the pre-approval letter request element.

* * * * *